United States Patent
Behue et al.

(10) Patent No.: US 6,936,674 B2
(45) Date of Patent: Aug. 30, 2005

(54) POLYMERIZATION PROCESS

(75) Inventors: Patrick Daniel Yves Behue, Istres (FR); Marianne Gil, Istres (FR); Susan Katherine Christie, Edinburgh (GB); John Norman Reid Samson, Stirling (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 10/148,596

(22) PCT Filed: Nov. 30, 2000

(86) PCT No.: PCT/GB00/04578

§ 371 (c)(1), (2), (4) Date: Oct. 21, 2002

(87) PCT Pub. No.: WO01/40323

PCT Pub. Date: Jun. 7, 2001

(65) Prior Publication Data

US 2003/0120001 A1 Jun. 26, 2003

(30) Foreign Application Priority Data

Dec. 3, 1999 (GB) ............................. 9928679

(51) Int. Cl.⁷ ..................... C08F 110/02; C08F 210/16
(52) U.S. Cl. ..................... 526/348.1; 428/98; 428/220; 428/339; 526/171; 526/172
(58) Field of Search ............... 526/348.1, 171, 526/172; 428/220, 339, 98

(56) References Cited

U.S. PATENT DOCUMENTS 6,274,684 B1 * 8/2001 Loveday et al. ............. 526/114
6,368,545 B1 * 4/2002 Bailey et al. ................ 264/514

FOREIGN PATENT DOCUMENTS

| EP | 0 319 258 | 6/1989 |
| WO | WO98/27124 | 6/1998 |
| WO | WO99/12981 | 3/1999 |
| WO | WO99/46308 | 9/1999 |

* cited by examiner

Primary Examiner—Roberto Rabago
(74) Attorney, Agent, or Firm—Finnegan, Henderson, Farabow, Garrett and Dunner, L.L.P.

(57) ABSTRACT

A process for producing a poly-olefin is disclosed, which comprises contacting at least one 1-olefin under polymerisation conditions with a polymerisation catalyst or catalyst system comprising (1) a compound having the Formula (I) wherein M is Fe[II], Fe[III], Co[I], Co[II], Co[III], Mn[I], Mn[II], Mn[III], Mn[IV], Ru[II], Ru[III], Ru[IV], V[II], V[III], V[IV], or V[V], Ti[II], Ti[III] or Ti[IV]; X represents an atom or group covalently or ionically bonded to the transition metal M; T is the oxidation state of the transition metal M and b is the valency of the atom or group X; $R^1$, $R^2$, $R^3$, $R^4$, $R^5$, $R^6$ and $R^7$ are independently selected from hydrogen, halogen, hydrocarbyl, substituted hydrocarbyl, heterohydrocarbyl or substituted heterohydrocarbyl; and when any two or more of $R^1$–$R^7$ are hydrocarbyl, substited hydrocarbyl, heterohydrocarbyl or substituted heterohydrocarbyl, said two or more can be linked to form one or more cyclic substituents; and optionally (2) an activating quantity of an activator compound comprising a Lewis acid capable of activating the catalyst for olefin polymerisation; and then subjecting the resulting polyolefin to crosslinking conditions. The polymer produced can be formed into shaped articles or films with desirable physical properties (I)

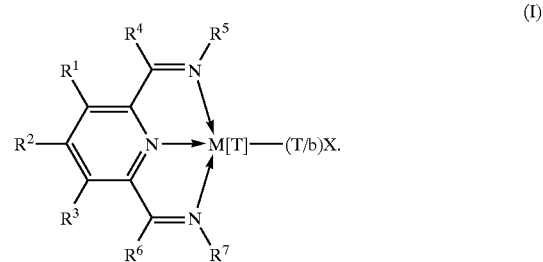

11 Claims, 2 Drawing Sheets

Stiffness vs Dart impact for Fe polymers

In Fig.1 above: $M = -6.58D^2 + 148.82D + 20$
where
D = Dart impact in g/μm
M = Minimum (MD secant modulus / TD secant modulus)

POLYMERIZATION PROCESS

BACKGROUND OF THE INVENTION

The present invention relates to crosslinked (reticulated) polyethylene compositions and processes for obtaining them.

Many different grades of polyethylene are manufactured for different applications, and equally there is a wide variety of physical properties of polyethylene which are important in each case. Crosslinked polyethylene is polyethylene in which the polymer chains are connected by covalent bonding to form a three-dimensional network. Such polyethylene generally has a range of enhanced properties compared with conventional polyethylene: improved heat stability, better chemical and stress crack resistance at high temperature, increased impact strength and abrasion resistance, reduced shrinkage, and enhanced long-term strength.

The use of certain transition metal compounds to polymerise 1-olefins, for example, ethylene, is well established in the prior art. Silica-supported chromium catalysts using the Phillips process have been known for several decades. The use of Ziegler-Natta catalysts, for example those catalysts produced by activating titanium halides with organometallic compounds such as triethylaluminium, is fundamental to many commercial processes for manufacturing polyolefins. In recent years the use of certain metallocene catalysts (for example biscyclopentadienylzirconiumdichloride activated with alumoxane) has provided catalysts with potentially high activity. These different catalyst systems provide polymeric products with a variety of properties.

Commodity polyethylenes are produced commercially in a variety of-different types and grades. Homopolymerisation of ethylene with transition metal based catalysts leads to the production of so-called "high density" grades of polyethylene. These polymers have relatively high stiffness and are useful for making articles where inherent rigidity is required, such as pipe and moulded products. Such articles are particularly suited to the use of crosslinked polyethylene.

WO 99/12981 discloses that ethylene may be polymerised using catalysts based on certain complexes, normally iron or cobalt, of selected 2,6-pyridinecarboxaldehydebis(imines) and 2,6-diacylpyridinebis(imines). Examples of high-density polyethylene compositions produced using such catalysts are disclosed in WO 99/46308. In WO 00/15646, which discloses specific complexes in the same class, and also in WO 00/24788, which discloses specific catalyst systems within the same class, it is mentioned generally that polymers of ethylene and propylene may be crosslinked using peroxide.

SUMMARY OF THE INVENTION

We have discovered that polyethylene made using the catalysts of WO 99/12981 can be crosslinked to a greater degree than other polyethylene, which can be advantageous for the crosslinking process.

Accordingly a first aspect of the invention provides a process for producing polyolefin, comprising contacting at least one 1-olefin under polymerisation conditions with a polymerisation catalyst or catalyst system comprising (1) a compound having the Formula (I)

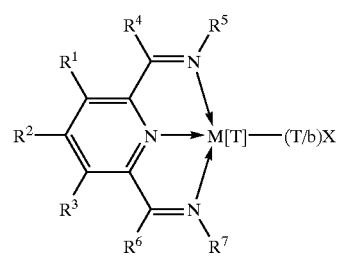

Formula (I)

wherein M is Fe[II], Fe[III], Co[I], Co[II], Co[III], Mn[I], Mn[II], Mn[III], Mn[IV], Ru[II], Ru[III], Ru[IV], V[II], V[III], V[IV] or V[V], Ti[II], Ti[III] or Ti[IV]; X represents an atom or group covalently or ionically bonded to the transition metal M; T is the oxidation state of the transition metal M and b is the valency of the atom or group X; $R^1$, $R^2$, $R^3$, $R^4$, $R^5$, $R^6$ and $R^7$ are independently selected from hydrogen, halogen, hydrocarbyl, substituted hydrocarbyl, heterohydrocarbyl or substituted heterohydrocarbyl; and when any two or more of $R^1$–$R^7$ are hydrocarbyl, substituted hydrocarbyl, heterohydrocarbyl or substituted heterohydrocarbyl, said two or more can be linked to form one or more cyclic substituents;

and optionally (2) an activating quantity of an activator compound comprising a Lewis acid capable of activating the catalyst for olefin polymerisation;

and then subjecting the resulting polyolefin to crosslinking conditions;

subject to the proviso that when the polyolefin is crosslinked using a peroxide compound, $R^5$ and $R^7$ are not both phenyl having at least a para-substituent which is either halogen in both cases or which has two or more carbon atoms in at least one case, and/or the atomic ratio of aluminium in the activator compound when it is alkylalumoxane to the transition metal M in (1) is not between 6:1 and 25:1.

In one embodiment the process comprises the steps of:
a) preparing a prepolymer-based catalyst by contacting a 1-olefin with the above catalyst system,
b) contacting the prepolymer-based catalyst with further 1-olefin,
c) subjecting the resultant polyolefin to crosslinking conditions.

In the text hereinbelow, the term "catalyst" is intended to include "catalyst system" as defined previously and also "prepolymer-based catalyst" as defined above.

The process of the present invention has the advantage that the polyolefin derived from the above catalyst is capable of being crosslinked to a greater degree than other polyolefins. As a result the crosslinking process can be performed at greater throughput of polymer, and/or less crosslinking agent may be used. The polymer may be crosslinked as a powder or in the form of pellets.

A further aspect of the invention comprises a process for producing a shaped or moulded polyolefin article or polyolefin in the form of a film, comprising (a) contacting at least one 1-olefin under polymerisation conditions with a polymerisation catalyst or catalyst system comprising a compound having the Formula (I).

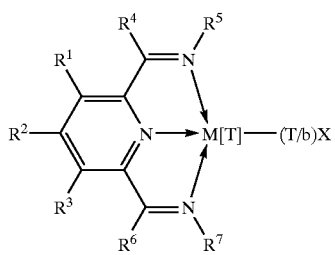

Formula (I)

wherein M is Fe[II], Fe[III], Co[I], Co[II], Co[III], Mn[I], Mn[II], Mn[III], Mn[IV], Ru[II], Ru[III], Ru[IV], V[II], V[III], V[IV] or V[V], Ti[II], Ti[III] or Ti[IV]; X represents an atom or group covalently or ionically bonded to the transition metal M; T is the oxidation state of the transition metal M and b is the valency of the atom or group X; $R^1$, $R^2$, $R^3$, $R^4$, $R^5$, $R^6$ and $R^7$ are independently selected from hydrogen, halogen, hydrocarbyl, substituted hydrocarbyl, heterohydrocarbyl or substituted heterohydrocarbyl; and when any two or more of $R^1$–$R^7$ are hydrocarbyl, substituted hydrocarbyl, heterohydrocarbyl or substituted heterohydrocarbyl, said two or more can be linked to form one or more cyclic substituents;
and optionally an activating quantity of an activator compound comprising a Lewis acid capable of activating the catalyst for olefin polymerisation;
(b) subjecting the resulting polyolefin to crosslinking conditions;
and (c) forming the crosslinked polyolefin into a shaped article or film.

We have found that articles made by the above process have properties particularly suitable for certain applications such as use as films, pipes or bottles, e.g. milk or fruit juice bottles. A further aspect of the invention comprises a shaped article or film comprising reticulated polymer formed from polymerisation of ethylene using a catalyst comprising a compound of Formula (I) as defined above. The shaped article formed in the above process is preferably a milk bottle.

Films made by the above process when the 1-olefin is ethylene are found to have unique properties, and accordingly a further aspect of the invention comprises a polyethylene film made from polyethylene produced in a single reactor, having a relationship $M>-6.58D^2+148.82D-90$, where D=dart impact in g/μm and M=the lower of machine direction secant modulus and transverse direction secant modulus.

DETAILED DESCRIPTION OF THE INVENTION

Figure 1:
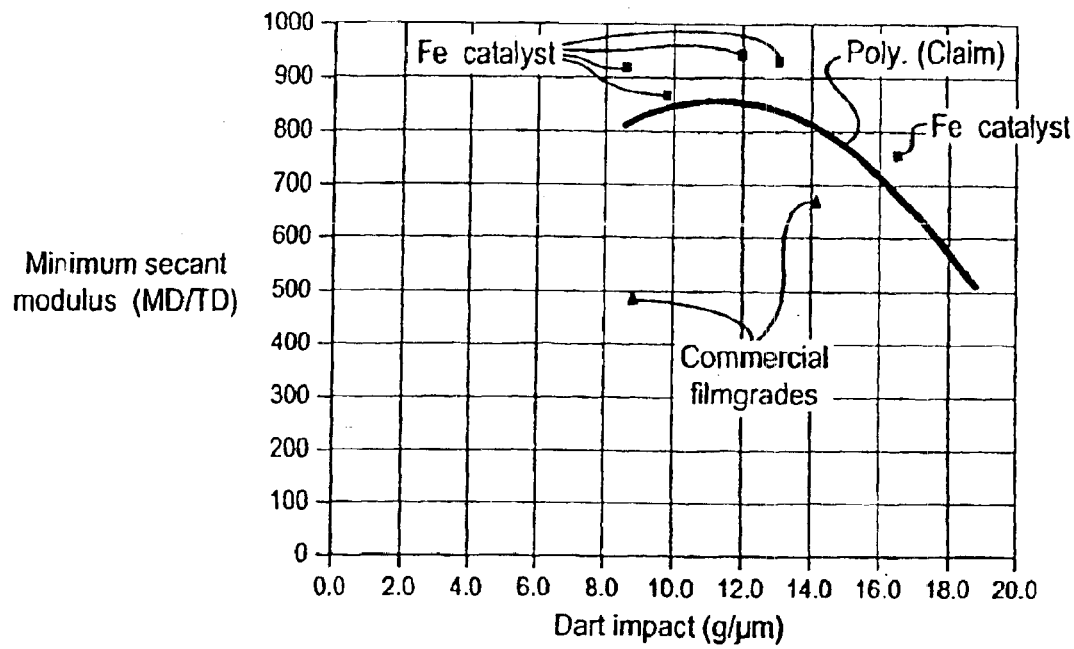
FIG. 1 shows the relationship between dart impact resistance and stiffness for films made from both the polymers of the invention and some commercial HD film grades, and also shows the curve defined by the invention.

The conditions used to crosslink the polymer as described above preferably involve the use of a peroxide as the crosslinking agent. Examples of peroxide compounds which can be utilised in the process of the present invention are dicumyl peroxide, 2,5-dimethyl-2,5-di-(t-butyl peroxy) hexane, t-butyl cumyl peroxide, di-(2-t-butylperoxy-isopropyl) benzene, di-t-butyl peroxide, 2,5-dimethyl-2,5-di-(t-butyl peroxy)hexyne-3, and cumene hydroperoxide.

The amount of peroxide used is generally between 0.001 and 5 weight percent based on the weight of the polymer in the composition, preferably between 0.001 and 0.1%. Other preferred ranges include 0.01 to 1 wt %, particularly between 0.01 and 0.1 wt %, or between 0.1 and 0.5 wt %.

The polymer and the peroxide may be contacted by any known method. For example they may be dry or melt blended, and then optionally fed into an extruder. Alternatively the polymer may be extruded without peroxide, and then contacted with it afterwards.

The temperature chosen for the cross-linking stage of fabrication is an adjustable variable which will be chosen by the processor to take account of the peroxide decomposition temperature, cross-linking rate, additive costs, and desired extrusion throughput rate. It must, in any case, be above the melting range of the base polymer (up to 145° C. for polyethylene according to grade and density). Preferred temperatures are between 180 and 300° C. A key advantage of carrying out the reaction in the melt is that a totally uniform cross-linked structure results without any hindrance from crystalline regions. This ensures that product performance is maintained at high temperature.

The polyolefin may alternatively be crosslinked by other known methods. They include the following:

The "Azo process" in which the polyolefin is mixed with an azo (—N=N—) compound and extruded at a temperature below that at which the azo compound would undergo scission. The extrudate is heated in a salt bath so that the azo compound forms free radicals which initiate crosslinking.

Silane technology may be used, in which vinyl silane is grafted onto the polyolefin using a peroxide initiator, and then steam or hot water in the presence of a catalyst used to generate siloxane crosslinking groups via a condensation reaction. These steps may be performed sequentially, or alternatively all the reactants may be extruded together.

Physical crosslinking processes may be used which involve an external source of radiation. Examples are β-radiation from electron beams generated in an accelerator.

Cross-linking technologies such as the silane process or electron beam irradiation are carried out in the solid state and have certain disadvantages. For example, the irradiation process requires expensive equipment and very high operating voltages for treating thick pipe sections where particular care has to be exercised to ensure uniform treatment of the article. Thus the peroxide process is the preferred method of crosslinking, as it provides advantages in speed, uniformity, and efficiency of cross-linking.

Some antioxidants and other typical additives used in compounding/ formulation may act as radical scavengers and so limit the effectiveness of the peroxide cross-linking reaction. In practice those skilled in the art will select an additive package which provides a level of stability, peroxide effectiveness, and processing speed balanced for their specific application needs.

In a further aspect, the present invention provides a crosslinked polyolefin composition having a residual iron content of from 0.001 to 1 ppm.

In the compound of Formula (I), $R^5$ and $R^7$ are preferably independently selected from substituted or unsubstituted alicyclic, heterocyclic or aromatic groups, for example, phenyl, 1-naphthyl, 2-naphthyl, 2-methylphenyl, 2-ethylphenyl, 2,6-diisopropylphenyl, 2,3-diisopropylphenyl, 2,4-diisopropylphenyl, 2,6-di-n-butylphenyl, 2,6-dimethylphenyl, 2,3-dimethylphenyl, 2,4-dimethylphenyl, 2-t-butylphenyl, 2,6-diphenylphenyl, 2,4,6- trimethylphenyl, 2,6-trifluoromethylphenyl, 4-bromo-2,6-dimethylphenyl, 3,5 dichloro2,6-diethylphenyl, and 2,6,bis (2,6-dimethylphenyl)phenyl, cyclohexyl and pyridinyl.

In a preferred embodiment $R^5$ is represented by the group "P" and $R^7$ is represented by the group "Q" as follows:

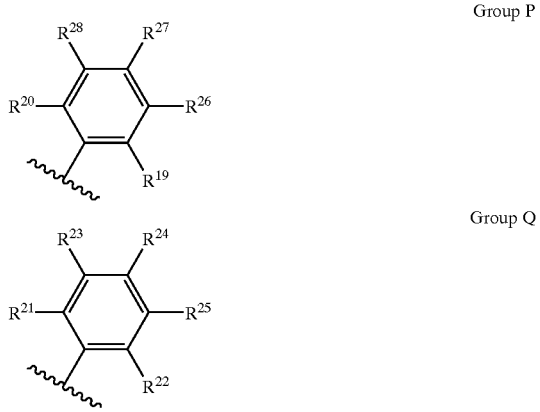

Group P

Group Q wherein $R^{19}$ to $R^{28}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more can be linked to form one or more cyclic substituents.

The ring systems P and Q are preferably independently 2,6-hydrocarbylphenyl or fused-ring polyaromatic, for example, 1-naphthyl, 2-naphthyl, 1-phenanthrenyl and 8-quinolinyl.

Preferably at least one of $R^{19}$, $R^{20}$, $R^{21}$ and $R^{22}$ is hydrocarbyl, substituted hydrocarbyl, heterohydrocarbyl or substituted heterohydrocarbyl. More preferably at least one of $R^{19}$ and $R^{20}$, and at least one of $R^{21}$ and $R^{22}$, is hydrocarbyl, substituted hydrocarbyl, heterohydrocarbyl or substituted heterohydrocarbyl. Most preferably $R^{19}$, $R^{20}$, $R^{21}$ and $R^{22}$ are all independently selected from hydrocarbyl, substituted hydrocarbyl, heterohydrocarbyl or substituted heterohydrocarbyl. $R^{19}$, $R^{20}$, $R^{21}$ and $R^{22}$ are preferably independently selected from methyl, ethyl, n-propyl, iso-propyl, n-butyl, sec-butyl, tert.-butyl, n-pentyl, neopentyl, n-hexyl, 4-methylpentyl, n-octyl, phenyl and benzyl.

$R^1$, $R^2$, $R^3$, $R^4$, $R^6$, $R^{19}$, $R^{20}$, $R^{21}$, $R^{22}$, $R^{23}$, $R^{25}$, $R^{26}$ and $R^{28}$ are preferably independently selected from hydrogen and $C_1$ to $C_8$ hydrocarbyl, for example, methyl, ethyl, n-propyl, n-butyl, t-butyl, n-hexyl, n-octyl, phenyl and benzyl.

In an alternative embodiment $R^5$ is a group having the formula —$NR^{29}R^{30}$ and $R^7$ is a group having the formula —$NR^{31}R^{32}$, wherein $R^{29}$ to $R^{32}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{29}$ to $R^{32}$ are hydrocarbyl, substituted hydrocarbyl, heterohydrocarbyl or substituted heterohydrocarbyl, said two or more can be linked to form one or more cyclic substituents.

Each of the nitrogen atoms is coordinated to the metal by a "dative" bond, i.e. a bond formed by donation of a lone pair of electrons from the nitrogen atom. The remaining bonds on each N atom are covalent bonds formed by electron sharing between the N atoms and the organic ligand as shown in the defined formula for the metal complex illustrated above.

The atom or group represented by X in the compounds of Formula (I) can be, for example, selected from halide, sulphate, nitrate, thiolate, thiocarboxylate, $BF_4^-$, $PF_6^-$, hydride, hydrocarbyloxide, carboxylate, hydrocarbyl, substituted hydrocarbyl and heterohydrocarbyl, or β-diketonates. Examples of such atoms or groups are chloride, bromide, methyl, ethyl, propyl, butyl, octyl, decyl, phenyl, benzyl, methoxide, ethoxide, isopropoxide, tosylate, triflate, formate, acetate, phenoxide and benzoate. Preferred examples of the atom or group X in the compounds of Formula (I) are halide, for example, chloride, bromide; hydride; hydrocarbyloxide, for example, methoxide, ethoxide, isopropoxide, phenoxide; carboxylate, for example, formate, acetate, benzoate; hydrocarbyl, for example, methyl, ethyl, propyl, butyl, octyl, decyl, phenyl, benzyl; substituted hydrocarbyl; heterohydrocarbyl; tosylate; and triflate. Preferably X is selected from halide, hydride and hydrocarbyl. Chloride is particularly preferred.

The atoms or groups represented by X in the compound of Formula (I) are preferably selected from halide, sulphate, nitrate, thiolate, thiocarboxylate, $BF_4^-$, $PF_6^-$, hydride, hydrocarbyloxide, carboxylate, hydrocarbyl, substituted hydrocarbyl and heterohydrocarbyl. Examples of such atoms or groups are chloride, bromide, methyl, ethyl, propyl, butyl, octyl, decyl, phenyl, benzyl, methoxide, ethoxide, isopropoxide, tosylate, triflate, formate, acetate, phenoxide and benzoate.

It is preferred that the activator compound (2) is an organoaluminium compound or a hydrocarbylboron compound. Suitable organoaluminium compounds include trialkyaluminium compounds, for example, trimethylaluminium, triethylaluminium, tributylaluminium, tri-n-octylaluminium, ethylaluminium dichloride, diethylaluminium chloride and alumoxanes. Alumoxanes are well known in the art as typically the oligomeric compounds which can be prepared by the controlled addition of water to an alkylaluminium compound, for example trimethylaluminium. Such compounds can be linear, cyclic or mixtures thereof Commercially available alumoxanes are generally believed to be mixtures of linear and cyclic compounds. The cyclic alumoxanes can be represented by the formula $[R^{16}AlO]_s$ and the linear alumoxanes by the formula $R^{17}(R^{18}AlO)_s$ wherein s is a number from about 2 to 50, and wherein $R^{16}$, $R^{17}$, and $R^{18}$ represent hydrocarbyl groups, preferably $C_1$ to $C_6$ alkyl groups, for example methyl, ethyl or butyl groups.

Examples of suitable hydrocarbylboron compounds are dimethylphenylammoniumtetra(phenyl)borate, trityltetra(phenyl)borate, triphenylboron, dimethylphenylammonium tetra(pentafluorophenyl)borate, sodium tetrakis[(bis-3,5-trifluoromethyl)phenyl]borate, $H^+(OEt_2)[(bis-3,5-trifluoromethyl)phenyl]borate$, trityltetra(pentafluorophenyl)borate and tris(pentafluorophenyl)boron.

In the preparation of the preferred catalysts for making the polymers utilised in the present invention, the quantity of activating compound selected from organoaluminium compounds and hydrocarbylboron compounds to be employed is easily determined by simple testing, for example, by the preparation of small test samples which can be used to polymerise small quantities of the monomer(s) and thus to determine the activity of the produced catalyst. It is generally found that the quantity employed is sufficient to provide 0.1 to 20,000 atoms, preferably 1 to 2000 atoms of aluminium or boron per metal atom in the compound of Formula (I).

The following are examples of nitrogen-containing transition metal complexes (1) which may be used as catalysts in the process of the invention:

2,6-diacetylpyridinebis(2,6-diisopropylanil)FeCl$_2$
2,6-diacetylpyridine(2,6-diisopropylanil)MnCl$_2$
2,6-diacetylpyridine(2,6-diisopropylanil)CoCl$_2$
2,6-diacetylpyridinebis(2-tert.-butylanil)FeCl$_2$
2,6-diacetylpyridinebis(2,3-dimethylanil)FeCl$_2$
2,6-diacetylpyridinebis(2-methylanil)FeCl$_2$
2,6-diacetylpyridinebis(2,4-dimethylanil)FeCl$_2$
2,6-diacetylpyridinebis(2,4,6-trimethylanil)FeCl$_2$
2,6-diacetylpyridinebis(2,6-dimethylanil)FeCl$_2$
2,6-dialdiminepyridinebis(2,6-dimethylanil)FeCl$_2$
2,6-dialdiminepyridinebis(2,6-diethylanil)FeCl$_2$
2,6-dialdiminepyridinebis(2,6-diisopropylanil)FeCl$_2$
2,6-dialdiminepyridinebis(1-naphthil)FeCl$_2$ and
2,6-bis(1,1-diphenylhydrazone)pyridine.FeCl$_2$.

The catalysts may contain a mixture of compounds of formula (I) such as, for example, a mixture of 2,6-diacetylpyridinebis(2,6-diisopropylanil)FeCl$_2$ complex and 2,6-diacetylpyridinebis(2,4,6-trimethylanil)FeCl$_2$ complex, or a mixture of 2,6diacetylpyridine(2,6-diisopropylanil) CoCl$_2$ and 2,6-diacetylpyridinebis(2,4,6-trimethylanil) FeCl$_2$. In addition to said one or more defined transition metal compounds, the catalysts of the present invention can also include one or more other types of transition metal compounds or catalysts, for example, transition metal compounds of the type used in conventional Ziegler-Natta catalyst systems, metallocene-based catalysts, or heat activated supported chromium oxide catalysts (e.g. Phillips-type catalyst).

The catalysts utilised in the present invention can be unsupported or supported on a support material, for example, silica, alumina, or zirconia, or on a polymer or prepolymer, for example polyethylene, polystyrene, or poly (aminostyrene).

If desired the catalysts can be formed in situ in the presence of the support material, or the support material can be pre-impregnated or premixed, simultaneously or sequentially, with one or more of the catalyst components. The catalysts of the present invention can if desired be supported on a heterogeneous catalyst, for example, a magnesium halide supported Ziegler Natta catalyst, a Phillips type (chromium oxide) supported catalyst or a supported metallocene catalyst. Formation of the supported catalyst of the formula (I) can be achieved for example by treating the transition metal compounds of the present invention with alumoxane in a suitable inert diluent, for example a volatile hydrocarbon, slurrying a particulate support material with the product and evaporating the volatile diluent. The produced supported catalyst is preferably in the form of a free-flowing powder. The quantity of support material employed can vary widely, for example from 100,000 to 1 grams per gram of metal present in the transition metal compound.

The catalyst and optional activator (2) may be contacted with the olefin to be polymerised in the form of a single catalyst system, or they may be added to the reactor separately.

The polymerisation conditions can be, for example, solution phase, slurry phase, gas phase or bulk phase, with polymerisation temperatures ranging from –100° C. to +300° C., and at pressures of atmospheric and above, particularly from 140 to 4100 kPa. If desired, the catalyst can be used to polymerise ethylene under high pressure/high temperature process conditions wherein the polymeric material forms as a melt in supercritical ethylene. Preferably the polymerisation is conducted under gas phase fluidised bed or stirred bed conditions.

Suitable monomers for use in the polymerisation process of the present invention are, for example, ethylene and C$_{2-20}$ α-olefins, specifically propylene, 1-butene, 1-pentene, 1-hexene, 4-methylpentene-1, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene. Other monomers include methyl methacrylate, methyl acrylate, butyl acrylate, acrylonitrile, vinyl acetate, and styrene. Preferred monomers for homopolymerisation processes are ethylene and propylene.

The catalysts and process of the invention can also be used for copolymerising ethylene or propylene with each other or with other 1-olefins such as 1-butene, 1-hexene, 4-methylpentene-1, and octene, or with other monomeric materials, for example, methyl methacrylate, methyl acrylate, butyl acrylate, acrylonitrile, vinyl acetate, and styrene.

Irrespective of the polymerisation or copolymerisation technique employed, polymerisation or copolymerisation is typically carried out under conditions that substantially exclude oxygen, water, and other materials that act as catalyst poisons. Also, polymerisation or copolymerisation can be carried out in the presence of additives to control polymer or copolymer molecular weights.

The use of hydrogen gas as a means of controlling the average molecular weight of the polymer or copolymer applies generally to the polymerisation process of the present invention. For example, hydrogen can be used to reduce the average molecular weight of polymers or copolymers prepared using gas phase, slurry phase, bulk phase or solution phase polymerisation conditions. The quantity of hydrogen gas to be employed to give the desired average molecular weight can be determined by simple "trial and error" polymerisation tests.

The polymerisation process of the present invention provides polymers and copolymers, especially ethylene polymers, at remarkably high productivity (based on the amount of polymer or copolymer produced per unit weight of complex employed in the catalyst system). This means that relatively very small quantities of transition metal complex are consumed in commercial processes using the process of the present invention. It also means that when the polymerisation process of the present invention is operated under polymer recovery conditions that do not employ a catalyst separation step, thus leaving the catalyst, or residues thereof, in the polymer (e.g. as occurs in most commercial slurry and gas phase polymerisation processes), the amount of transition metal complex in the produced polymer can be very small.

Slurry phase polymerisation conditions or gas phase polymerisation conditions are particularly useful for the production of high or low density grades of polyethylene, and polypropylene. In these processes the polymerisation conditions can be batch, continuous or semi-continuous. Furthermore, one or more reactors may be used, e.g. from two to five reactors in series. Different reaction conditions, such as different temperatures or hydrogen concentrations may be employed in the different reactors. In the slurry phase process and the gas phase process, the catalyst is generally metered and transferred into the polymerisation zone in the form of a particulate solid either as a dry powder (e.g. with an inert gas) or as a slurry. This solid can be, for example, a solid catalyst system formed from the one or more of complexes of the invention and an activator with or without other types of catalysts, or can be the solid catalyst alone with or without other types of catalysts. In the latter situation, the activator can be fed to the polymerisation zone, for example as a solution, separately from or together with the solid catalyst. Preferably the catalyst system or the transition metal complex component of the catalyst system employed in the slurry polymerisation and gas phase polymerisation is supported on one or more support materials. Most preferably the catalyst system is supported on the support material prior to its introduction into the polymerisation zone. Suitable support materials are, for example, silica, alumina, zirconia, talc, kieselguhr, or magnesia. Impregnation of the support material can be carried out by conventional techniques, for example, by forming a solution or suspension of the catalyst components in a suitable diluent or solvent, and slurrying the support material therewith. The support material thus impregnated with catalyst can then be separated from the diluent for example, by filtration or evaporation techniques. Once the polymer product is discharged from the reactor, any associated and absorbed hydrocarbons are substantially removed, or degassed, from the polymer by, for example, pressure letdown or gas purging using fresh or recycled steam, nitrogen or light hydrocarbons (such as ethylene). Recovered gaseous or liquid hydrocarbons may be recycled to the polymerisation zone.

In the slurry phase polymerisation process the solid particles of catalyst, or supported catalyst, are fed to a polymerisation zone either as dry powder or as a slurry in the polymerisation diluent. The polymerisation diluent is compatible with the polymer(s) and catalyst(s), and may be an alkane such as hexane, heptane, isobutane, or a mixture of hydrocarbons or paraffins. Preferably the particles are fed to a polymerisation zone as a suspension in the polymerisation diluent. The polymerisation zone can be, for example, an autoclave or similar reaction vessel, or a continuous loop reactor, e.g. of the type well-know in the manufacture of polyethylene by the Phillips Process. When the polymerisation process of the present invention is carried out under slurry conditions the polymerisation is preferably carried out at a temperature above 0° C., most preferably above 15° C. The polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerisation in the presence of hydrogen gas which acts as chain transfer agent. Generally, the higher the concentration of hydrogen employed, the lower the average molecular weight of the produced polymer.

In bulk polymerisation processes, liquid monomer such as propylene is used as the polymerisation medium.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst in the bed. The bed is generally cooled by the addition of cool gas (e.g. recycled gaseous monomer) and/or volatile liquid (e.g. a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid in the polymerisation zone is small in relation to the quantity of polymer present. This is in contrast to "solution phase" processes wherein the polymer is formed dissolved in a solvent, and "slurry phase" processes wherein the polymer forms as a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn form the polymerisation zone with the produced polymer.

For typical production of impact copolymers, homopolymer formed from the first monomer in a first reactor is reacted with the second monomer in a second reactor. For manufacture of propylene/ethylene impact copolymer in a gas-phase process, propylene is polymerized in a first reactor; reactive polymer transferred to a second reactor in which ethylene or other comonomer is added. The result is an intimate mixture of a isotactic polypropylene chains with chains of a random propylene/ethylene copolymer. A random copolymer typically is produced in a single reactor in which a minor amount of a comonomer (typically ethylene) is added to polymerizing chains of propylene.

Methods for operating gas phase fluidised bed processes for making polyethylene, ethylene copolymers and polypropylene are well known in the art. The process can be operated, for example, in a vertical cylindrical reactor equipped with a perforated distribution plate to support the bed and to distribute the incoming fluidising gas stream through the bed. The fluidising gas circulating through the bed serves to remove the heat of polymerisation from the bed and to supply monomer for polymerisation in the bed. Thus the fluidising gas generally comprises the monomer(s) normally together with some inert gas (e.g. nitrogen or inert hydrocarbons such as methane, ethane, propane, butane, pentane or hexane) and optionally with hydrogen as molecular weight modifier. The hot fluidising gas emerging from the top of the bed is led optionally through a velocity reduction zone (this can be a cylindrical portion of the reactor having a wider diameter) and, if desired, a cyclone and or filters to disentrain fine solid particles from the gas stream. The hot gas is then led to a heat exchanger to remove at least part of the heat of polymerisation. Catalyst is preferably fed continuously or at regular intervals to the bed. At start up of the process, the bed comprises fluidisable polymer which is preferably similar to the target polymer. Polymer is produced continuously within the bed by the polymerisation of the monomer(s). Preferably means are provided to discharge polymer from the bed continuously or at regular intervals to maintain the fluidised bed at the desired height. The process is generally operated at relatively low pressure, for example, at 10 to 50 bars, and at temperatures for example, between 50 and 120° C. The temperature of the bed is maintained below the sintering temperature of the fluidised polymer to avoid problems of agglomeration.

In the gas phase fluidised bed process for polymerisation of olefins the heat evolved by the exothermic polymerisation reaction is normally removed from the polymerisation zone (i.e. the fluidised bed) by means of the fluidising gas stream as described above. The hot reactor gas emerging from the top of the bed is led through one or more heat exchangers wherein the gas is cooled. The cooled reactor gas, together with any make-up gas, is then recycled to the base of the bed. In the gas phase fluidised bed polymerisation process of the present invention it is desirable to provide additional cooling of the bed (and thereby improve the space time yield of the process) by feeding a volatile liquid to the bed under conditions such that the liquid evaporates in the bed thereby absorbing additional heat of polymerisation from the bed by the "latent heat of evaporation" effect. When the hot recycle gas from the bed enters the heat exchanger, the volatile liquid can condense out. In one embodiment of the present invention the volatile liquid is separated from the recycle gas and reintroduced separately into the bed. Thus, for example, the volatile liquid can be separated and sprayed into the bed. In another embodiment of the present invention the volatile liquid is recycled to the bed with the recycle gas. Thus the volatile liquid can be condensed from the fluidising gas stream emerging from the reactor and can be recycled to the bed with recycle gas, or can be separated from the recycle gas and then returned to the bed.

The method of condensing liquid in the recycle gas stream and returning the mixture of gas and entrained liquid to the bed is described in EP-A-0089691 and EP-A-0241947. It is preferred to reintroduce the condensed liquid into the bed separate from the recycle gas using the process described in our U.S. Pat. No. 5,541,270, the teaching of which is hereby incorporated into this specification.

When using the catalysts of the present invention under gas phase polymerisation conditions, the catalyst, or one or more of the components employed to form the catalyst can, for example, be introduced into the polymerisation reaction zone in liquid form, for example, as a solution in an inert liquid diluent. Thus, for example, the transition metal component, or the activator component, or both of these components can be dissolved or slurried in a liquid diluent and fed to the polymerisation zone. Under these circumstances it is preferred the liquid containing the component(s) is sprayed as fine droplets into the polymerisation zone. The droplet diameter is preferably within the range 1 to 1000 microns. EP-A-0593083, the teaching of which is hereby incorporated into this specification, discloses a process for introducing a polymerisation catalyst into a gas phase polymerisation. The methods disclosed in EP-A-0593083 can be suitably employed in the polymerisation process of the present invention if desired.

Although not usually required, upon completion of polymerisation or copolymerisation, or when it is desired to terminate polymerisation or copolymerisation or at least temporarily deactivate the catalyst or catalyst component of this invention, the catalyst can be contacted with water, alcohols, acetone, or other suitable catalyst deactivators a manner known to persons of skill in the art.

The polymers may be blown into films, or may be used for making a variety of moulded or extruded articles such as pipes or cables, and containers such as bottles or drums. Specific additive packages for each application may be selected as known in the art. Examples of supplemental additives include slip agents, anti-blocks, anti-stats, mould release agents, primary and secondary anti-oxidants, clarifiers, nucleants, uv stabilizers, and the like. Classes of additives are well known in the art and include phosphite antioxidants, hydroxylamine (such as N,N-dialkyl hydroxylamine) and amine oxide (such as dialkyl methyl amine oxide) antioxidants, hindered amine light (uv) stabilizers, phenolic stabilizers, benzofuranone stabilizers, and the like. Various olefin polymer additives are described in U.S. Pat. Nos. 4,318,845, 4,325,863, 4,590,231, 4,668, 721, 4,876,300, 5,175,312, 5,276,076, 5,326,802, 5,344,860, 5,596,033, and 5,625,090.

Fillers such as silica, glass fibers, talc, and the like, nucleating agents, and colourants also may be added to the polymer compositions as known by the art.

EXAMPLES

Example 1

Preparation of 2,6-diacetylpyridinebis(2,4,6 trimethylanil) iron dichloride supported on MAO/silica 1.1 Preparation of 2,6-diacetylpyridinebis(2,4,6-trimethylanil)

To a solution of 2,6-diacetylpyridine (0.54 g; 3.31 mmol) in absolute ethanol (20 ml) was added 2,4,6-trimethylaniline (1.23 g; 2.5 eq). After the addition of 2 drops of acetic acid (glacial) the solution was refluxed overnight. Upon cooling to room temperature the product crystallised from ethanol. The product was filtered, washed with cold ethanol and dried in a vacuum oven (50° C.) overnight. The yield was 60% of theoretical. $^1$H NMR(CDCl$_3$): 8.50, 7.95, 6.94, (m, 7H, ArH, pyrH), 2.33 (s, 6H, N=CCH$_3$), 2.28 (s, 6H, CCH$_3$), 2.05 (s, 12H, CCH$_3$). Mass spectrum: m/z 397 [M]$^+$.

1.2 Preparation of 2,6-diacetylpyridinebis(2,4,6-trimethylanil)FeCl$_2$

FeCl$_2$ (0.15 g; 1.18 mmol) was dissolved in hot n-butanol (20 ml) at 80° C. A suspension of 2,6-diacetylpyridinebis (2,4,6-trimethylaniline(0.5 g; 1.18 mmol) in n-butanol was added dropwise at 80° C. The reaction mixture turned blue. After stirring at 80° C. for 15 minutes the reaction was allowed to cool down to room temperature. The reaction volume was reduced to a few ml and diethyl ether was added to precipitate the product as a blue powder, which was subsequently washed three times with 10 ml diethyl ether. The yield was 64% of theoretical.

Mass spectrum: m/z 523 [M]$^{30}$, 488 [M−Cl]$^+$, 453 [M−Cl$_2$]$^+$.

1.3 Preparation of 2,6diacetylpyridinebis(2,4,6 trimethyl anil) iron dichloride supported on MAO/silica All operations were conducted under nitrogen unless specified. Silica (256.62 g of grade ES70X supplied by Crosfield), calcined at 200° C. under flowing nitrogen, was placed in a 2L round bottomed flask. Toluene (900 ml) was added to the silica followed by methyl aluminoxane (441 ml, 1.5M in toluene supplied by Witco). The MAO was allowed to react with the silica at room temperature for 10 minutes at which point the temperature was raised to 80° C. and the slurry was mixed occasionally by manually shaking the flask. The temperature was maintained between 80–100° C. for a period of 2 hours.

2,6-diacetylpyridinebis(2,4,6 trimethyl anil) iron dichloride (3.48 g) was slurried in toluene (50 ml) and added to the MAO/silica slurry at 80° C. A further aliquot of toluene (20 ml) was used to ensure that all of the Fe complex was transferred to the MAO/silica. The Fe/MAO/silica was then heated at 80° C., with occasional shaking, for 1.5 hours and the solid allowed to settle. The clear supernatant solution was decanted from the flask and the catalyst partially dried under vacuum at 80° C. for 30 minutes and then left at room temperature for 16 hours. Drying of the catalyst was then continued, at 80° C. under vacuum for a further 5 hours, until a dry free flowing powder resulted and no more solvent could be detected coming off the support.

1.4 Slurry Polymerisations

A 93 liter Phillips continuous polymerisation loop reactor was used for the polymerisation. Ethylene, isobutane diluent, hydrogen and the catalyst prepared in Example 1.3 above were metered into the reactor to maintain the reaction conditions as detailed below. The reactor was operated at a polyethylene throughput of approximately 7.5 kg/hour. Polymer molecular weight was controlled by variation of hydrogen addition rate.

| Reaction conditions | Ex. 1.4 |
| --- | --- |
| Temperature (° C.) | 80 |
| Catalyst Productivity (g/g) | 4495 |
| Solids (wt %) | 24 |
| Ethylene (vol %) | 16 |
| Isobutane (liters/hour) | 22.9 |
| $H_2$ (ml/min, 600 psig) | 30–35 |
| Residence time (hours) | 1.6 |
| Product: | |
| HLMI (21.6 kg: g/10 mins) | 2.0 |
| Annealed density (kg/m³) | 956.4 |

Example 2

Polymerisation using 2,6diacetylpyridinebis(2,4,6 trimethylanil) iron dichloride supported on MAO/silica The same catalyst as in Example 1 was used for the polymerisation reaction: however the polymerisation conditions were different, as shown below:

| Reaction conditions | Ex. 2 |
| --- | --- |
| Temperature (° C.) | 90 |
| Catalyst Productivity (g/g) | 10860 |
| TiBAl (M/hr) | 0.03 |
| Ethylene (vol %) | 16 |
| $H_2$ (vol %) | 0.045 |
| Product: | |
| HLMI (21.6 kg: g/10 mins) | 3.2 |
| Annealed density (kg/m³) | 958 |

Polymers made using catalysts such as the above catalyst may have a Molecular Weight Distribution (MWD) wherein the width of the MWD at half the peak height is at least 1.6.

Figure 2:
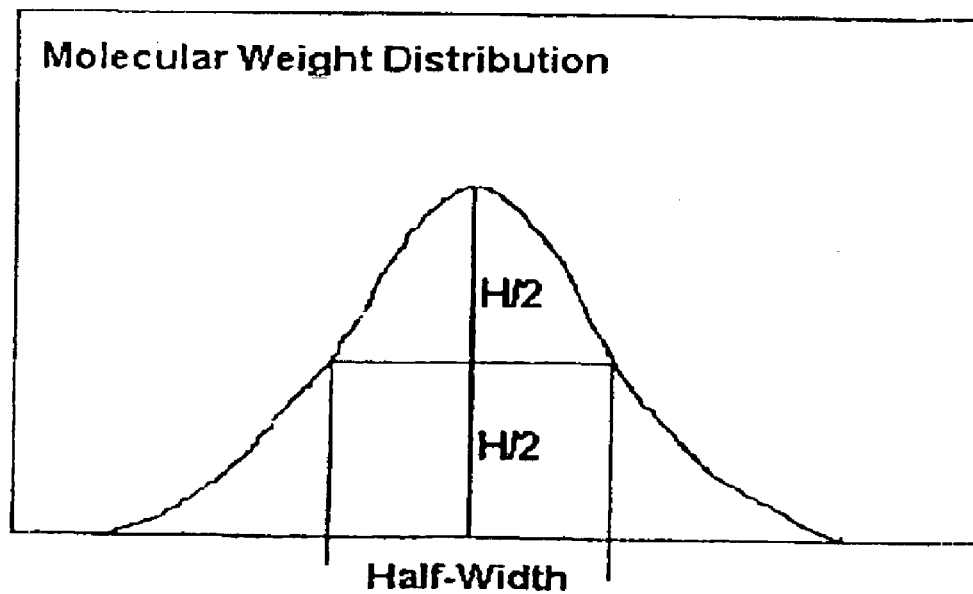
FIG. 2 illustrates how the half-width is defined.

The half-width is defined as the width of the MWD (Dlog($M_w$)) at half the peak height, H. FIG. 2 illustrates this.

The MWD of the polymers was determined from gel permeation chromatography (more precisely size exclusion chromatography) according to NAMAS method MT/GPC/02. The weight average molecular weight, $M_w$, and its ratio, $M_w/M_n$, to the number average molecular weight were measured by this method.

Example 3

Crosslinking

The high molecular weight ethylene homopolymers of Examples 1 and 2 and a further commercial polyethylene were crosslinked with peroxide, and the degree of crosslinking determined by measuring the rheological properties of the samples according to the method described below.

The method describes obtaining a torque curve using a Monsanto Rheometer with oscillating disk (type ODR 2000E). At temperatures above the vulcanization point, the rheometer measures the change in shear modulus of vulcanizable polyethylene due to the chemical crosslinking of the polymer chains. The difference between maximum and minimum torque values gives an indication of the degree of crosslinking.

Sample Preparation

The powdered samples of polyethylene were soaked in a glass jar lying on rotating rollers in an oven, with 2% dicumyl peroxide, at 80° C. for 90 minutes. To enable proper mixing of the peroxide and polymer powder a temporary baffle was fixed inside the mixing jar. Once cool the sample mixtures were then re-bagged.

Preparation of the Test Specimen

A method of directly moulding a disc for testing was developed in order to minimise heating of the specimen prior to testing and to avoid the problem of the specimen shattering.

On a heavy aluminium plate, about 6 mm thick, was placed 0.2 mm thick aluminium foil and then a 'Mylar' sheet 0.05 mm thick, with a steel ring 12 mm thick, 50 mm in diameter and with a hole of 35 mm diameter resting on top of the 'Mylar'. The hole in the ring was filled and tamped until 'proud' with polymer then covered with 'Mylar' sheet, aluminium foil and a second heavy aluminium plate. The whole sandwich was then placed in a heated press at 130° C. under light pressure (about 10 bar). The sample was left for 3 minutes to soften then the pressure was increased to 200 bar and held for a further 7 minutes, so that the sample was at 130° C. for a total of 10 minutes. The press was then opened and the specimen removed from the mould whilst still hot and immediately transferred to the Monsanto rheometer and the test started.

Crosslinking Determination Test

The temperature of the rheometer was raised to 180° C., the sample disc placed on the rotor and the chamber closed. The rotor was then activated, and temperature and torque measured as a function of time. The torque initially falls as the temperature in the chamber rises to the test temperature, 180° C. For a material which does not crosslink the torque would stabilise at this low level (minimum value). When crosslinking occurs in a polymer it becomes more viscous as the network is formed and thus the torque rises and stabilises at a new higher level (maximum value) when crosslinking is complete. The difference between these minimum and maximum torque values is proportional to the amount of crosslinking occurring.

Results

Three polymers were evaluated using the above procedure: those of Examples 1 and 2, and also HM5420AP, a polyethylene produced using a Phillips-type chromium catalyst, which is the unstabilised feedstock for commercial polymer Rigidex HM 5420XP.

The average of five determinations of the torque difference was taken; results are shown in Table 2 below.

TABLE 2

| | Max-Min difference (dNm) | | |
| --- | --- | --- | --- |
| Run | Example 1 | Example 2 | HM 5420AP |
| 1 | 67.80 | 79.13 | 53.40 |
| 2 | 62.03 | 83.37 | 55.05 |
| 3 | 64.05 | 82.24 | 54.64 |
| 4 | 64.37 | 85.77 | 56.99 |
| 5 | 69.11 | 99.24 | 55.54 |
| Average | 65.48 | 83.75 | 55.12 |
| Standard deviation | 2.89 | 3.46 | 1.31 |

The above results show two key improvements for the products of this invention over prior art polymers from Phillips catalyst technology when used in the peroxide cross-linking process. Firstly, as Table 2 shows, for a given peroxide addition level it is possible to reach a substantially higher level of cross-linking in materials of comparable molecular weight and processability. This enables cost savings to be made through use of less peroxide while still achieving the optimum cross-link level for resistance to rapid crack propagation, stress cracking, and long term high temperature performance. Secondly, the products of this invention demonstrate a higher rate of cross-linking. This is illustrated by the figures in the table below for the time required to achieve the same torque as the comparative Phillips polymer does at its T90 (i.e. 90% of the difference between max/min torque values quoted in Table 2). A faster rate of cross-linking provides further opportunities for the processor to speed throughput (hence reducing costs) and so overcome a disadvantage of the Engel process over alternative radiation cross-linking technologies.

| Polymer | Time to HM5420 T90 Torque |
| --- | --- |
| HM5420 | 3.5 mins |
| Example 1 | 2.7 mins |
| Example 2 | 2.0 mins |

Example 4

4.1—Catalyst Preparation

The catalyst used was 2,6-diacetylpyridinebis(2,4,6-trimethylanil)FeCl$_2$ activated with methylaluminoxane (MAO) and supported on silica (Crosfield grade ES70X). The preparation of this catalyst is described in detail in WO 99/46304, the content of which is incorporated herein by reference.

4.2—Polymerisation

The polymerisations were carried out in a fluidised bed gas phase polymerisation reactor consisting of a plenum, a distribution grid, a vertical cylinder of diameter 0.75 m and height 5 m and a velocity reduction chamber. The hot reaction gases exiting the fluidised bed reactor pass through the expanded velocity reduction zone and are recycled to the reactor via a line equipped with a compressor and with a heat transfer means. The cooled recycle gas enters the reactor plenum in the lower part of the reactor vessel and into the fluidised bed consisting of a high density polyethylene powder via the distribution grid. Fresh make-up ethylene, hexane, hydrogen and nitrogen, which represent the main constituents of the gas reaction mixture are introduced into the recycle line.

The gas reaction mixture, which contains ethylene, hexane, hydrogen and nitrogen and other minor components passes through the fluidised bed at a pressure of 2.4 MPa, and with an upward fluidisation velocity of 0.42 m/s.

The polyethylene powder produced is continuously withdrawn to maintain a constant fluidised bed height.

The catalyst used was the catalyst prepared according to Example 1. The catalyst injection rate was set such as to maintain the production rate constant at the desired level. The polymerisation conditions were as follows:

T=90° C.

Partial pressure ethylene=12 bar

Ratio H$_2$:ethylene=0.38

Partial pressure hexane=1.6 bar

Production rate=100 kgPE/h

The results of the polymerisation were:

Productivity=4.8 kgPE/gcat; MI 2=0.5; density na=0.962 g/cm$^3$ 4.3—Crosslinking Polymer prepared as in Example 4.2 was compounded on a Werner ZSK58 extruder with varying amounts of Trigonox 101 (2,5 bis(terbutylperoxy)-2,5-dimethylhexane, available from Akzo-Nobel). Conditions of the compounding are given in Table 3 below.

TABLE 3

| Elements | Sample A | Sample B | Sample C |
| --- | --- | --- | --- |
| Trigonox 101 (ppm) | 0 | 25 | 50 |
| Feed rate (kg/h) | 246 | 246.5 | 246 |
| No. of blades of knife | 9 | 9 | 9 |
| Screw speed (turns/min) | 326 | 322 | 322 |
| Couple (%) | 69.1 | 65.6 | 69.8 |
| Specific Energy (kWh/kg) | 0.192 | 0.182 | 0.194 |
| Temperature of zone 2 (° C.) | 161 | 159 | 160 |
| Temperature of zone 3 (° C.) | 181 | 179 | 180 |
| Temperature of zone 4 (° C.) | 212 | 224 | 212 |
| Temperature of zone 5 (° C.) | 225 | 230 | 226 |
| Temperature of shutter valve (° C.) | 222 | 222 | 222 |
| Angle of opening of shutter | 80/81 | 82 | 80/81 |
| Temperature of material Tm3* (° C.) | 227.9 | 228 | 230 |
| Pressure of material P3* (bar) | 120.5 | 114.1 | 124.3 |
| Temperature of gear pump (° C.) | 220 | 220 | 220 |
| Pressure of material P4# (bar) | 39.6 | 39.7 | 39.6 |
| Temperature of attachment piece (° C.) | 220 | 221 | 220 |
| Temperature of material Tm4^ (° C.) | 247.9 | 249.5 | 251.1 |
| Pressure of material P5^ (bar) (Die) | 114.4 | 117.0 | 122.3 |
| Temperature of die (° C.) | 220 | 220 | 220 |

*Tm3 and P3 refer to temperature/pressure at the end of the screw
P4 refers to pressure at inlet to gear pump
^Tm4 and P5 refer to temperature/pressure at the input of the die 4.4—Blow-moulding into Bottles The compounded Samples A, B and C were blow-moulded to produce milk bottles on two different extruders, a Bekum BM08 and a Uniloy 2016. Details of the processing performance of the three samples and the physical and mechanical properties of the resulting bottles are given in Table 4 below, together with corresponding details for a commercially available Phillips polyethylene which is used commercially to make milk bottles, HD6007XA.

TABLE 4

|  | | HD6007XA | Sample A (0 ppm) | Sample B (25 ppm) | Sample C (50 ppm) |
| --- | --- | --- | --- | --- | --- |
| Physical properties | | | | | |
| Melt index 2.16 kg | g/600s | 0.63 | 0.56 | 0.48 | 0.28 |
| Annealed Density | kg/m$^3$ | 963.9 | 965.1 | 965.7 | 964.5 |
| Direct density (bottle) | kg/m$^3$ | 947.3 | 947.4 | 948.7 | 947.5 |
| Charpy Impact @ 23° C. | kJ/m$^2$ | 8.7 | 14.6 | 12.2 | 16.0 |
| Melt flow rate ratio | | 93.5 | 66.2 | 90.0 | 100.4 |
| Melt strength @ 16 MPa | cN | 11.0 | 7.1 | 8.5 | 9.7 |
| Melt strength Pressure coefficient | cN/MPa | 0.559 | 0.469 | 0.554 | 0.537 |
| Bekum BM08 | | | | | |
| Base Scar | mm | 39.8 | 34.8 | 36.8 | 35.9 |
| Bottle weight | g/min | 15.6 | 13.1 | 13.7 | 13.5 |
| Shear Rate at m/f | s$^{-1}$ | >2333 | 1795 | >2318 | 2060 |
| Uniloy 2016 Die Swell | | | | | |
| Bottle weight | g | 67 | 63.3 | 63.5 | 63.3 |
| Base scar | mm | 110 | 110.6 | 108.8 | 107.3 |
| 40 g Milk Bottle | | | | | |
| Base Weight | % | 4.75 | 5.50 | 5.80 | 6.10 |
| Drop Time | s | 2.46 | 2.18 | 2.06 | 2.32 |
| Bottle weight | g | 40.4 | 39.7 | 40.3 | 40.0 |
| Base Scar | mm | 115.1 | 120.9 | 119.2 | 115.0 |

Physical Properties

As expected, an MI drop was apparent in the reticulated samples. There was an approximate 50% drop in going from 0 ppm to 50 ppm peroxide samples.

The melt flow rate ratio was observed to increase with increasing levels of reticulation, indicating an increase in polymer elasticity with increased crosslinking.

Direct density was assessed from bottle wall and was comparable with standard HD6007XA product.

Impact—Charpy impact was significantly higher than for standard HD6007XA product.

This is a very advantageous result for manufacture of milk bottles.

Processing Properties

The materials were readily processed on the Bekum BM08 to produce good quality bottles. Higher head pressures were generated by the reticulated products relative to the non-reticulated control and the HD6007 reference material. This is expected and is primarily a consequence of the MI change caused by reticulation. The melt fracture performance of the 50 ppm peroxide reticulated material was considered to be very good given the lower MI of this product.

On the Bekum the materials are processed below the shear discontinuity. At these processing rates the materials under evaluation all demonstrated low area and diameter swell relative to HD6007XA. There is limited evidence for a small increase in swell from 0 ppm to 50 ppm. The differences in swell on this type of machine are not considered to be as commercially significant as the swell performance on the Uniloy.

On the Uniloy all the materials were processed to produce good quality milk bottles with acceptable surface finish.

The 50 ppm material was observed to be clearly lower diameter swell than the control material This is reflected in the measurements for base scar at milk bottle conditions. The area swell for this material was also lower than the control and the HD6007XA.

The push-out time of the 50 ppm reticulated polymer increased slightly by 0.1 s relative to the control material. Although this does correspond to a marginal increase in cycle time it is certainly comparable and possibly still marginally faster than HD6007XA Phillips material.

Surface finish was commercially acceptable in bottles produced on both machines.

The melt strength of the polymer was measured at 190° C., using a Göttfert Rheotens extensional rheometer in conjunction with a Rosand RH 7 Capillary Rheometer. The process was as follows:

The polymer is extruded at a constant pressure (P) through a die of 1.5 mm diameter and 30 mm in length, with a 90° entry angle. Once a given extrusion pressure is selected, the piston of the capillary rheometer will travel through its 15 mm diameter barrel at a speed that is sufficient to maintain that pressure constant. The nominal wall shear rate ($\gamma$) for a given extrusion pressure can then be computed for the polymer at the selected pressure using the constant pressure ratio system of the rheometer. The extrudate is drawn with a pair of gear wheels at an accelerating speed (V). The acceleration ranges from 0.12 to 1.2 cm/s$^2$ depending on the flow properties of the polymer under test. The drawing force (F) experienced by the extrudate is measured with a transducer and recorded on a chart recorder together with the drawing speed. The maximum force at break is defined as melt strength (MS) at a constant extrusion pressure (P) or at its corresponding extrusion rate ($\gamma$). Three or four extrusion pressures (6, 8, 12, 16 MPa) are typically selected for each polymer depending on its flow properties. For each extrusion pressure, a minimum of 3 MS measurements are performed and an average MS value is then obtained.

The derivative function of the extrusion pressure dependent melt strength, $\partial D(MS)/\partial(P)$, for each polymer is computed from the slopes (by a least square line fitting) of the plot of the average MS against pressure. The melt strength at an extrusion pressure of 16 MPa, MS(16 MPa), is also computed from the plot, and is given in Table 4 above.

An important factor in the selection of blow moulding resins for producing handled bottles is the effective diameter swell of the parison. The parison swell is a complex function of weight swell, the rate of swell and the melt strength. It is also affected by processing conditions, e.g. extrusion rate, parison drop time and parison weight. The values of the melt strength shown in Table 4 show that the melt strength of the reticulated products can be increased significantly by the addition of peroxides, leading to a suitable diameter swell during blow moulding process on the Uniloy machine. The sensitivity of the melt strength to variation of the extrusion pressure of the Fe products has also been modified, as shown by the values of the extrusion pressure dependent melt strength, □(MS)/□D(P) in Table 4, where an addition of 25 ppm of peroxide has improved the melt strength potential of the reticulated products to similar to that of the Philips-type polymer (HD6007XA).

Example 5

A polymerisation was conducted and the polymer compounded with peroxide substantially as described in Examples 4.1 to 4.3. Details of the polymer are given in Table 5 below.

Storage Modulus G'

Storage Modulus G' is defined as the storage modulus measured at a loss modulus (G") of 5 kPa. The procedure for measuring G' is as follows:

Samples for dynamic rheometry are prepared by compression moulding sheet (nominally 1–2 mm thickness) using an electrically heated hydraulic press. The starting powder or pellet is placed between the pre-heated platens of the press (200° C.) and allowed to heat for 1 minute before being pressed for 2 minutes. The heating is switched off, and the press water-cooled to ambient temperature before the moulding is released.

Dynamic frequency scans are carried out using a rotational rheometer (Rheometrics ARES-2KFRTN1-FCO-STD) equipped with 25 mm diameter parallel plates enclosed in an environmental chamber. The environmental chamber is heated using nitrogen gas to avoid excessive sample degradation during testing. A 25 mm diameter disk is stamped from moulded sheet and placed between the pre-heated rheometer plates, which are then closed in such a way as to avoid the generation of excessive normal forces. The sample is trimmed and the oven closed to establish a testing temperature of 190° C. A frequency scan is then performed at 10% applied strain over the range 100 rad/s to 0.01 rad/s.

The storage modulus (G') and the loss modulus (G") are then calculated at each testing frequency using standard equations [Draft International Standard ISO/DIS 6721/10]. G' is then plotted against G", and the value of G' at G"=5 kPa is quoted. The units of G' are kPa.

TABLE 5

|  | Example 5.1 10049 | Example 5.2 10049-1 | Example 5.3 10049-2 |
|---|---|---|---|
| POWDER PROPERTIES |  |  |  |
| MI/8.5 (g/10 min) | 1.09 | 1.09 | 1.09 |
| HLMI/21.6 (g/10 min) | 7.56 | 7.56 | 7.56 |
| MFR (21.6/8.5) | 6.9 | 6.9 | 6.9 |
| COMPOUNDING |  |  |  |
| Output (kg/hr) | 298 | 298 | 298 |
| Specific energy (kWh/kg) | 0.190 | 0.192 | 0.191 |
| Melt temperature (° C.) | 220 | 220 | 220 |
| STABILISATION |  |  |  |
| St Zn (ppm) | 1000 | 1000 | 1000 |
| StCa (ppm) | 1000 | 1000 | 1000 |
| Irganox 1010 (ppm) | 1000 | 1000 | 1000 |
| Irganox 1076 (ppm) | 1000 | 1000 | 1000 |
| Trigonox 101 (ppm) | 0 | 20 | 50 |
| PELLET PROPERTIES |  |  |  |
| MI/8.5 (g/10 min) | 1.09 | 0.95 | 0.70 |
| HLMI/21.6 (g/10 min) | 7.7 | 6.8 | 5.5 |
| n (21.6/8.5) | 2.10 | 2.11 | 2.21 |
| Density (non-annealed) kg/m³ | 958.1 | 958.1 | 958.1 |
| DYNAMIC RHEOMETER |  |  |  |
| G' (G" = 500 Pa, T = 190° C.) | 102.5 | 214.9 | 325.2 |
| Tan delta (190° C.) | 3.32 | 1.88 | 1.36 |
| Eta (0) (190° C.) | 154 | 299 | 547 |

Example 6

Film Blowing

Example 6.1

Polymerisation

A gas phase reactor was operated at 90° C. temperature and 20 bars pressure. Into the reactor was added ethylene, hydrogen, nitrogen and a polymerisation catalyst prepared as described in WO 99/46308 so that a polyethylene having HLMI of about 7.6 g/10 min and density 958.1 kg/m³ was formed.

The powder extracted from the polymerisation reactor was stabilised with 2000 ppm of long term anti-oxidants (Irganox 1010/Irganox 1076), 2000 ppm of neutralizers (calcium stearate/zinc stearate) and 50 ppm of Trigonox 101 (peroxide). The blend of powder and additives was then compounded in a twin screw extruder type Werner 58. The output of such an extruder is typically 300 kg/h with a specific energy of about 0.19 kWh/kg. The compounding conditions are detailed in Table 6 below:

TABLE 6

| Elements | No peroxide | 50 ppm of Trigonox 101 |
|---|---|---|
| Feed rate (kg/h) | 300 | 298 |
| No. of blades of knife |  | 9 |
| Screw speed (turns/min) | 320 | 324 |
| Couple (%) |  | 83.4 |
| Specific Energy (kWh/kg) |  | 0.191 |
| Temperature of zone 2 (° C.) | 160 | 162 |
| Temperature of zone 3 (° C.) | 180 | 180 |
| Temperature of zone 4 (° C.) | 220 | 227 |
| Temperature of zone 5 (° C.) | 230 | 235 |
| Temperature of shutter valve (° C.) | 220 | 220 |
| Angle of opening of shutter | 5 | 5 |
| Temperature of material Tm3 (° C.) |  | 227.9 |
| Pressure of material P3 (bar) |  | 89.2 |
| Temperature of pump (° C.) | 220 | 221 |
| Pressure of material P4 (bar) | 40 | 39.5 |
| Temperature of attachment piece (° C.) | 220 | 221 |
| Temperature of material Tm4 (° C.) |  | 254.8 |
| Pressure of material P5 (bar) (Die) |  | 205.1 |
| Temperature of die (° C.) | 220 | 220 |

Example 6.2

Film Blowing

The material was blown to a film on a Kiefel film line with a die diameter D of 100 mm, and a die gap of 1.2 mm. The screw diameter was 40 mm. The output was 50 kg/h and the temperature profile along the screw was from 190° C. to 220° C. The targeted film sickness was 15 microns, with a neck height equal to 8 die diameters and a Blow Up Ratio of 5:1.

The High Load Melt Index (HLMI) or $MFR_{21.6}$ was measured according to ASTM D1238 condition F, 21.6 kg at 190° C. The annealed density was measured to specification ISO 1872-1. The polymer average Molecular weight Mw and polydispersity index Mw/Mn while measured by GPC.

The mechanical properties on the films produced the work then measured: the dart impact was determined according to ASTM D1709-85; the Elmendorf tear strength was determined according to ASTM D1922-89; the tensile properties, including modulus were measured according to ASTM D-882.

In addition to mechanical properties the Film Appearance Rating (FAR), which is a measurement of the gels and fish-eyes content, was given to each film sample. A positive value (i.e. above zero) is considered a good rating.

The processability of the polymer was measured by "Bubble stability" during the extrusion process, which is quoted in 4 different extrusion conditions, by a note from 0 to 5 with 5 being the best. The conditions tested were 2 neck heights at 8× Die diameters and 5× Die diameters, and respectively 2 Blow Up Ratio at 3:1 and 5:1. A bubble stability higher than 2.5 in average is considered as good for commercial grades.

The properties of the material can be seen in the first column of Table 7.

Example 6.3

Comparative

A commercially available unimodal material based on a chromium catalyst Rigidex HD5301AA was blown to film, in the same conditions as Example 6.2 above with a temperature profile between 190 and 210° C. The properties of the material and the film can be seen in the second column of Table 7.

Example 6.4

Comparative

Another commercially available bimodal material based on a Ziegler-Natta type catalyst Hostalen GM9255F was blown to film, employing the same blowing conditions presented in Example 6.2 above, with a temperature profile along the screw between 190 and 210° C. The properties of the material and the film can be seen in the third column of Table 7.

TABLE 7

|  | Example 6.2 | Comparative Example 6.3 | Comparative Example 6.4 |
| --- | --- | --- | --- |
| $MFR_{21.6}$ (g/10 min) | 5.5 | 7.9 | 8.8 |
| "n" (21.6/2.16) | 2.2 | 2.4 | 2.4 |
| Density (kg/m³) | 960.1 | 950.6 | 957 |
| Catalyst type | Invention | Chromium | Ziegler-Natta |
| Mw/Mn | 11.3 | 21.3 | 17.1 |
| Dart Impact (g) | 280 | 131 | 212 |
| Tear strength MD (g/25 µm) | 18.5 | 16.6 | 16.2 |
| Secant modulus MD | 759 | 491 | 672 |
| Secant modulus TD | 872 | 609 | 799 |
| FAR | +10 | +20 | +40 |
| Film thickness (µm) | 17 | 15 | 15 |

The main benefits of the film of Example 6.2 are improved impact and stiffness compared with selected conventional Cr based materials or even bimodal Ziegler-Natta polymer, with a very good tear strength. The high impact value is exceptional in view of the high density of the product (960.1) associated with the narrow Molecular Weight Distribution as measured by the GPC Mw/Mn polydispersity index. In addition the FAR of the film is good for a lab scale product at +10.

Example 7

Examples 7.1 and 7.2

A gas phase reactor was operated at 90° C. temperature and 20 bars pressure. Into the reactor was added ethylene, hydrogen, nitrogen and a polymerisation catalyst prepared according to WO 99/46308 so that a polyethylene having a HLMI of about 13 g/10 min and density about 960 kg/m³ was formed.

The powder extracted from the polymerisation reactor was stabilised with 2000 ppm of long term anti-oxidants (Irganox 1010/Irganox 1076), 2000 ppm of neutralizers (calcium stearate/zinc stearate) and 50 ppm of Trigonox 101 (for Example 7.1) or 70 ppm of Trigonox 101(Example 7.2). The blends of powder and additives were then compounded in a twin screw extruder type Werner 58. The output was typically 250 kg/h with a specific energy of about 0.19 kW/kg. The compounding conditions are detailed in Table 8 below:

TABLE 8

| Elements |  | Example 7.1 | Example 7.2 |
| --- | --- | --- | --- |
| Trigonox 101 (ppm) | 0 | 50 | 70 |
| Feed rate (kg/h) | 250 | 246 | 246 |
| No. of blades of knife |  | 9 | 9 |
| Screw speed (turns/min) | 320 | 322 | 322 |
| Couple (%) |  | 69.8 | 69.6 |
| Specific Energy (kWh/kg) |  | 0.194 | 0.193 |
| Temperature of zone 2 (° C.) | 160 | 160 | 161 |
| Temperature of zone 3 (° C.) | 180 | 180 | 180 |
| Temperature of zone 4 (° C.) | 215 | 212 | 211 |
| Temperature of zone 5 (° C.) | 230 | 226 | 227 |
| Temperature of shutter valve (° C.) | 222 | 222 | 222 |
| Angle of opening of shutter | 82 | 80/81 | 80/81 |
| Temperature of material Tm3 (° C.) |  | 230 | 231.0 |
| Pressure of material P3 (bar) |  | 124.3 | 127.0 |
| Temperature of pump (° C.) | 224 | 220 | 221 |
| Pressure of material P4 (bar) | 40 | 39.6 | 39.5 |
| Temperature of attachment piece (° C.) | 220 | 220 | 220 |
| Temperature of material Tm4 |  | 251.1 | 252.9 |
| Pressure of material P5 (bar) |  | 122.3 | 127.7 |
| Temperature of die (° C.) | 220 | 220 | 220 |

The materials were blown to a film on a Kiefel film line with a die diameter D of 100 mm, and a die gap of 1.2 mm. The screw diameter was 40 mm. The output was 50 kg/h and the temperature profile along the screw was from 190° C. to 210° C. The targeted film thickness was 15 microns, with a neck height equal to 8 die diameters and a Blow Up Ratio of 5:1.

The properties of these materials can be seen in the first and second columns of Table 10.

Examples 7.3 and 7.4

A gas phase reactor was operated at 90° C. temperature and 20 bars pressure. Into the reactor was added, ethylene, hydrogen, nitrogen and a polymerisation catalyst prepared according to WO 99/46308 so that a polyethylene having a HLMI of about 11 g/10 min and density about 959 kg/m$^3$ was formed.

The powder extracted from the polymerisation reactor was stabilised with 2000 ppm of long term anti-oxidants (Irganox 1010/Irganox 1076), 2000 ppm of neutralizers (calcium stearate/zinc stearate) and 60 ppm of Trigonox 101 (for Example 7.3) or 100 ppm of Trigonox 101(Example 7.4). The blends of powder and additives were then compounded in a twin screw extruder type Werner 58. The output was typically 250 kg/h with a specific energy of about 0.22 kWh/kg. The compounding conditions were detailed in Table 9 below:

TABLE 9

|  | Example 7.3 | Example 7.4 |
|---|---|---|
| Trigonox 101 (ppm) | 60 | 100 |
| Feed rate (kg/h) | 246.6 | 246.4 |
| No. of blades of knife | 9 | 9 |
| Screw speed (turns/min) | 323.6 | 323.5 |
| Couple (%) | 79.8 | 80.5 |
| Specific Energy (kWh/kg) | 0.221 | 0.223 |
| Temperature of zone 2 (° C.) | 160 | 160 |
| Temperature of zone 3 (° C.) | 180 | 179 |
| Temperature of zone 4 (° C.) | 212 | 222 |
| Temperature of zone 5 (° C.) | 226 | 252 |
| Temperature of shutter valve (° C.) | 222 | 220 |
| Angle of opening of shutter | 80/81 | 80/81 |
| Temperature of material Tm3 (° C.) | 249.6 | 250.2 |
| Pressure of material P3 (bar) | 121.3 | 124.3 |
| Temperature of pump (° C.) | 220 | 232 |
| Pressure of material P4 (bar) | 39.5 | 39.6 |
| Temperature of attachment piece (° C.) | 220 | 220 |
| Temperature of material Tm4 (° C.) | 257.6 | 259.0 |
| Pressure of material P5 (bar) (Die) | 166.3 | 170.1 |
| Temperature of die (° C.) | 220 | 220 |

The materials were blown to a film on a Kiefel film line with a die diameter D of 100 mm, and a die gap of 1.2 mm. The screw diameter was 40 mm. The output was 50 kg/h and the temperature profile along the screw was from 190° C. to 210° C. The targeted film thickness was 15 microns, with a neck height equal to 8 die diameters and a Blow Up Ratio of 5:1.

The properties of these materials can be seen in the third and fourth columns of Table 10.

TABLE 10

|  | Example 7.1 | Example 7.2 | Example 7.3 | Example 7.4 |
|---|---|---|---|---|
| MFR$_{21.6}$ (g/10 min) | 10 | 9.7 | 7.6 | 6.4 |
| Density (kg/m$^3$) | 960.4 | 960.4 | 960 | 960 |
| Mw/Mn | 10.4 | 10.1 | 10.5 | 10.7 |

TABLE 10-continued

|  | Example 7.1 | Example 7.2 | Example 7.3 | Example 7.4 |
|---|---|---|---|---|
| Dart Impact (g) | 128 | 146 | 179 | 195 |
| Secant modulus MD | 921 | 870 | 1006 | 945 |
| Secant modulus TD | 1115 | 931 | 950 | 937 |
| Bubble Stability (../5) | 2.5 | 2.5 | 3.25 | 4 |
| Film thickness ($\mu$m) | 15 | 15 | 15 | 15 |

The above examples show that the film blown from the reticulated polyethylene of the invention exhibits an exceptional compromise between dart impact resistance and stiffness. All the examples satisfied a relationship between Secant Modulus (in MPa) and Dart impact (in g/$\mu$m) defined by the equation:

$$M > -6.58D^2 + 148.82D + 20,$$

where D=dart impact in g/$\mu$m and M=the lower of machine direction secant modulus and transverse direction secant modulus. Preferably film is satisfying the above relationship have a molecular weight distribution less than 20, more preferably less than 16, and most preferably less than 7. The compromise of properties represented by this relationship is unique. For a polyethylene produced in a single reactor, the compromise of properties is unique for the relationship $M > -6.58D^2 + 148.82D - X$, where X is 90, preferably 30 and more preferably zero. Generally, it is preferred that for films of the invention the lower of the machine direction and transverse direction secant modulus is greater than 600, preferably greater than 800. It is also preferred that for films of the invention the dart impact is greater than 6 g/$\mu$m, preferably greater than 8 g/$\mu$m. The density of all films as defined above is preferably greater than 957 kg/m$^3$.

The properties represented by the above equations are particularly useful for those films made on a film line having a flow rate of greater than 15 kg/hr. Generally, the catalysts used to make the polymer which is blown into a film are based on a single complex, and are not multi-site catalysts.

In addition the film exhibits a very good processability despite a narrow molecular weight distribution, i.e. Mw/Mn less than 16, with improved viscoelastic properties which are compatible with good conditions of conversion into film by blown extrusion, especially with good bubble stability.

It is well known that HDPE polyethylene may be produced in a single reactor from a chromium catalyst with a broad MWD. It is also clear that for a high stiffness, the mechanical properties have to be sacrified by increasing the density of the material. The advantage of the present invention is that it is capable of producing a high density product with an improved stiffness/impact balance, allowing for downgauging and increased downstream converting speed. Despite the narrow MWD of the polyethylene concerned the processability during film blowing is very good.

FIG. 1 shows the relationship between dart impact resistance and stiffness for films made from both the polymers of the invention and some commercial HD film grades, and shows also the curve defined by the invention: the polymers within the invention are in the upper right part of the graph.

What is claimed is:

1. A film made from polyethylene having an annealed density of greater than 957 kg/m$^3$ and having a relationship $M < -6.58D^2 + 148.82D + 20$, where D=dart impact in g/$\mu$m and M=the lower of machine direction secant modulus in MPa and transverse direction secant modulus in MPa.

2. A film made from polyethylene having an annealed density of greater than 957 kg/m$^3$ and a relationship $M < -6.58D^2 + 148.82D + 20$, where D=dart impact in g/μm and M=the lower of machine direction secant modulus in MPa and transverse direction secant modulus in MPa and wherein the polyethylene has been prepared by polymerizing monomer comprising ethylene using a catalyst comprising a catalytic complex comprising only one transition metal.

3. The film of claim 2, wherein the said transition metal is selected from the group consisting of Fe[II], Fe[III], Co[I], Co[II], Co[III], Mn[I], Mn[II], Mn[III], Mn[IV], Ru[II], Ru[III], Ru[IV], V[II], V[III], V[IV], V[V], Ti[II], Ti[III] and Ti[IV].

4. The film of claim 1 or 2, or wherein the polyethylene is a homopolymer.

5. The film of claim 1 or 2, wherein the polyethylene has a molecular weight distribution less than 20.

6. The film of claim 1 or 2, wherein the polyethylene has a molecular weight distribution less than 16.

7. The film of claim 1 or 2, wherein M is greater than 600.

8. The film of claim 1 or 2, wherein the dart impact is greater than 6 g/μm.

9. The film of claim 1 or 2, which is made on a film line having a flow rate greater than 15 kg/hr.

10. The film of claim 1 or 2, which is made from polyethylene produced in a single reactor.

11. A film made from polyethylene having a relationship $M < -6.58D^2 + 148.82D + 20$, where D=dart impact in g/μm and M=the lower of machine direction secant modulus in MPa and transverse direction secant modulus in MPa and wherein M is greater than 600 and the polyethylene has been prepared by polymerizing monomer comprising ethylene using a catalyst comprising only one catalytic complex comprising only one transition metal.

* * * * *